(12) United States Patent
Perri

(10) Patent No.: US 7,232,033 B2
(45) Date of Patent: Jun. 19, 2007

(54) CHAIN STORAGE DEVICE

(76) Inventor: Nicholas Perri, 236 Johnson Rd., Schuyler, NY (US) 13340

( * ) Notice: Subject to any disclaimer, the term of this patent is extended or adjusted under 35 U.S.C. 154(b) by 302 days.

(21) Appl. No.: 10/787,354

(22) Filed: Feb. 27, 2004

(65) Prior Publication Data
US 2005/0189248 A1    Sep. 1, 2005

(51) Int. Cl.
*A44B 7/00* (2006.01)
(52) U.S. Cl. .................... 206/348; 206/560; 206/388; 206/335
(58) Field of Classification Search ........... 206/348, 206/388, 560
See application file for complete search history.

(56) References Cited

U.S. PATENT DOCUMENTS

| | | | | |
|---|---|---|---|---|
| 3,811,724 A | * | 5/1974 | Woodward | 296/36 |
| 3,865,048 A | * | 2/1975 | Wallace | 410/111 |
| 4,229,131 A | * | 10/1980 | Hague | 410/12 |
| 4,598,820 A | * | 7/1986 | Murphy | 206/718 |
| 5,129,510 A | * | 7/1992 | Wright | 206/6.1 |
| 5,180,262 A | * | 1/1993 | Westerdale | 410/12 |
| 6,644,901 B2 | * | 11/2003 | Breckel | 410/104 |

\* cited by examiner

*Primary Examiner*—Mickey Yu
*Assistant Examiner*—Steven Pollicoff
(74) *Attorney, Agent, or Firm*—David Giglio

(57) ABSTRACT

There is provided a chain storage apparatus for storing a chain, wherein the chain includes a plurality of chain links. Each of the chain links has a link diameter, a latitudinal axis and a link width. Each of the chain links is interconnected with at least one other chain link and includes an inner and outer surface. The chain storage apparatus includes a chain link engagement means that engages at least one chain link. A first stopping means prevents the engaged chain link disengaging with the engagement means. A locking means includes a lock and unlock position, such that in the unlock position the locking means allows the chain ingress and egress to the engagement means, and in the lock position the engaged chain link is prevented from disengaging with said engagement means. A slotted channel has a pair of inwardly opposed bottom members, wherein the inwardly opposed bottom members engage the outer surface of the engaged link. A slotted opening formed between the inwardly opposed bottom members and wherein at least a second chain link is positioned between said slotted opening prevents substantial rotation about the latitudinal axis of a second chain link that is disposed between the slotted opening.

8 Claims, 12 Drawing Sheets

CHAIN STORAGE DEVICE

FIELD OF THE INVENTION

The present invention relates generally to the field of storing and transporting chains and, more particularly, to an apparatus that conveniently stores a chain in an organized and readily accessible and conveniently transportable manner.

BACKGROUND OF THE PRESENT INVENTION

Metal chains are used by many people for different purposes. Often times truck drivers find that chains stored in their trucks come in handy for a variety of reasons. Sometimes chains need to be carried a distance from the truck so that it can be used. For example, an object that must be towed is not always conveniently located at the rear of the truck. In the logging industry most trees are initially transported using chains.

Typically, chains used by heavy equipment operators have a chain link diameter of between $3/8$ to $1/2$ inch. For home use, the chain link diameter is typically $1/4$ inch.

Usually chains are stored by simply wrapping the chain in some fashion and placing on a floor. To transport the chain, the user typically wraps the chain about their arm and carries to a transport site. Often times, the chain becomes unshapely during storage as rides tend to be bumpy or other external factors vary the placement of various sections of the chain.

Organizing the chain becomes tedious and time consuming.

OBJECTS AND SUMMARY OF THE PRESENT INVENTION

It is an object of the present invention to improve the art of chain storage.

It is another object of the present invention to improve the art of using chains.

It is yet another object of the present invention to improve the art of transporting chains.

It is still another object of the present invention to improve the art of trucks.

It is a feature of the present invention to provide a chain storage apparatus that stores a chain in an organized and convenient fashion.

It is another feature of the present invention to provide a chain storage apparatus that is convenient to carry by hand.

It is yet another feature of the present invention to provide a chain storage apparatus that includes a quick release for easy chain access.

It is still another feature of the present invention to provide a chain storage apparatus that conveniently mounts to an upright surface.

It is still another feature of the present invention to provide a truck that conveniently stores a chain storage apparatus.

These and other objects and features are provided in accordance with the present invention in which there is provided a chain storage apparatus for storing a chain. The chain includes a plurality of chain links, wherein each of the chain links typically include the same link diameter, a latitudinal axis and a chain link width. Each of the chain links are interconnected with at least one other chain link. Each of the chain links have an inner and outer surface.

The chain storage apparatus includes a chain link engagement means that engages at least one chain link such that the at least one chain link is secured by the chain storage apparatus. A first stop prevents the engaged chain link from sliding out of the engagement means. A locking means includes a lock and unlock position. In the unlock position the locking means allows the at least one chain link ingress and egress to the engagement means. In the lock position the engaged chain link is prevented from becoming disengaged.

In a preferred embodiment, the chain link engagement means includes a slotted channel having a pair of inwardly opposed bottom surfaces, wherein the inwardly opposed bottom surfaces engage the outer surface of the at least one chain link. A slotted opening formed between the inwardly opposed bottom surfaces includes a width being greater than the diameter of the chain link. The width is large enough to allow a chain link, typically adjacent to the engaged link, to fit there through, but the width is small enough to prevent substantial rotation of the chain link about its latitudinal axis, thereby preventing the at least one engaged chain link from axially aligning and sliding through the slotted opening.

The slotted channel can include a top member, wherein a handle is upwardly disposed from the top member.

The slotted channel can be arcuately or straight shaped. Further, the chain storage apparatus can include a plurality of parallel situate slotted channels. The chain storage apparatus can include one or more intermediate stops so that one or more chains may be stored or only a portion of a single chain releases at a single time.

As an added feature the chain storage apparatus includes a side member having a first coupling means disposed therefrom. An exterior structure, such as a truck wall includes a second coupling means that mates with the first coupling means for convenient chain storage.

In yet another embodiment the engagement means includes a bottom member having at least one upwardly disposed protrusion. The upwardly disposed protrusion engages the inner surface of the at least one chain link. A hinging means allows the top member and bottom member to rotate away from each other for convenient access to the chain. To prevent the chain from becoming disengaged from the upwardly disposed protrusion, the distance between the top member and the top of the upwardly disposed protrusion is less than the chain link diameter.

BRIEF DESCRIPTION OF THE DRAWINGS

The above and other objects of the present invention will be better understood by reading the following detailed description of the preferred embodiments of the invention, when considered in connection with the accompanying drawings, in which.

DETAILED DESCRIPTION OF THE PRESENT INVENTION

The present invention will now be described in accordance with several embodiments. None of the described embodiments shall be so limited by those features as disclosed. Further, certain features shown and described in one embodiment can easily be incorporated into another embodiment as will become apparent from the description of the drawings.

Figure 1:
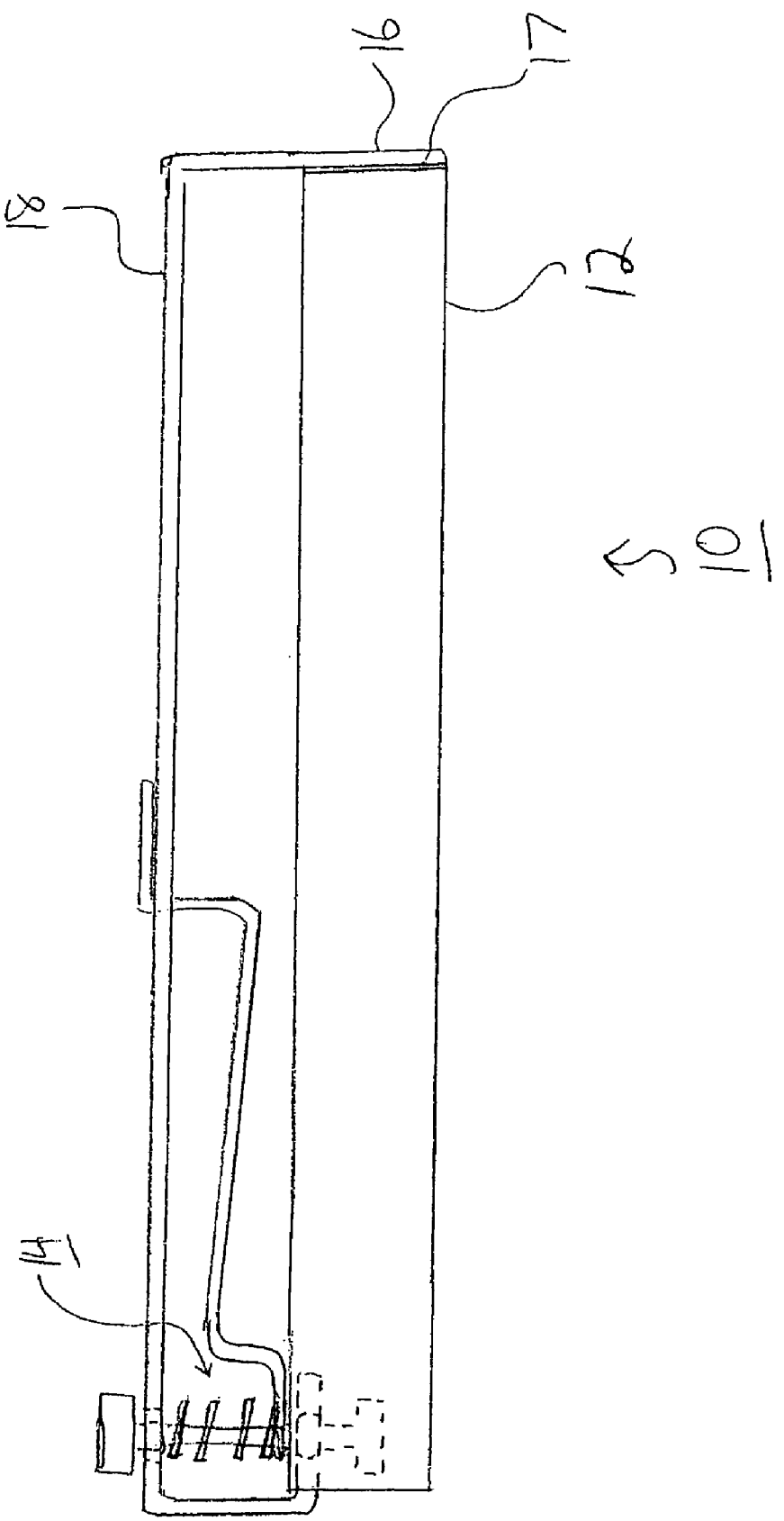
FIG. 1 is a side elevation view of a preferred embodiment of a chain carriage of the present invention.
Figure 2:
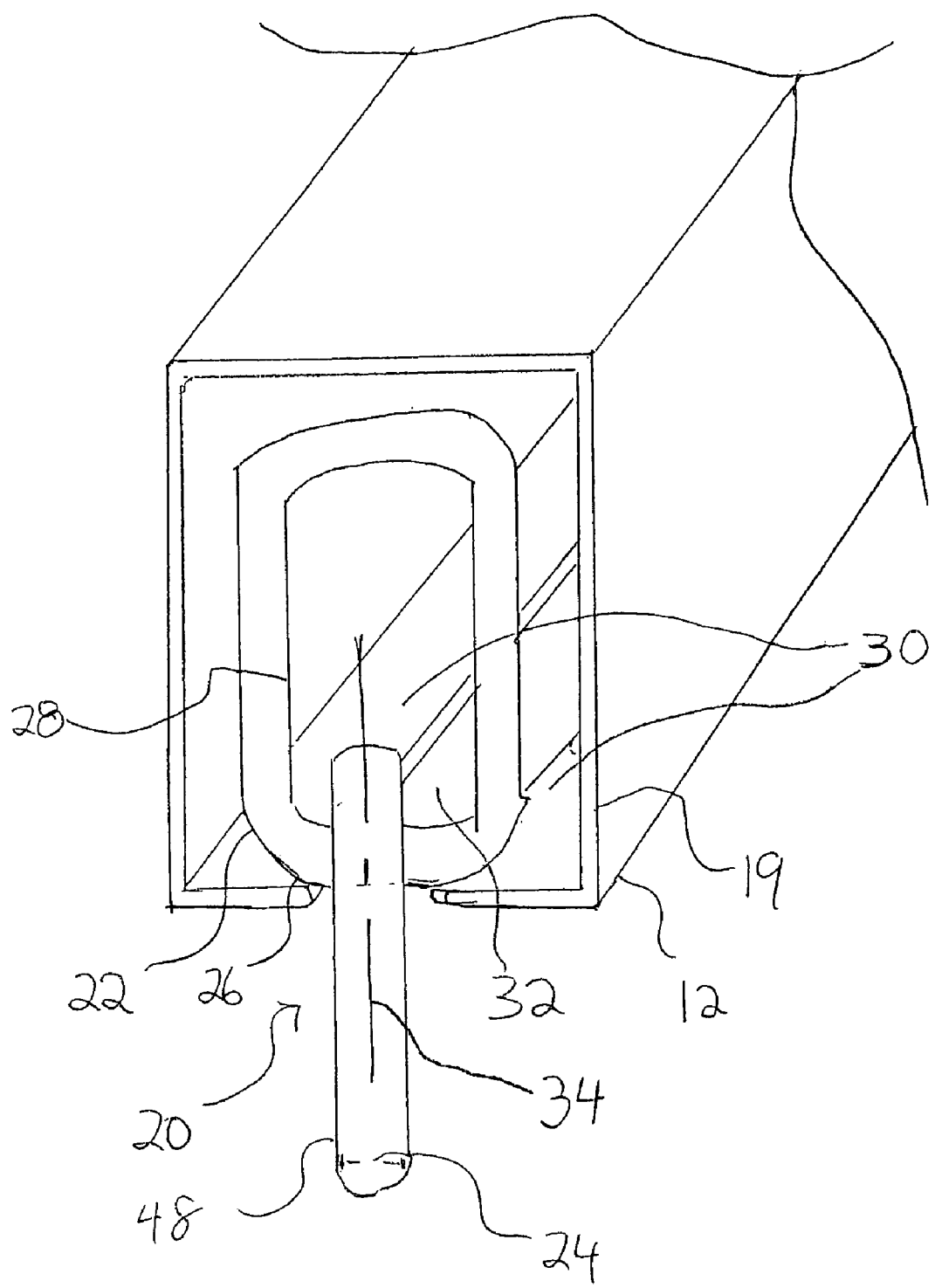
FIG. 2 is a front perspective view of a partial lower section of the chain carriage of FIG. 1.

Referring now to FIGS. 1 and 2 there is shown a chain carriage 10 in accordance with a preferred embodiment of the present invention. Chain carriage 10 conveniently stores a chain 20 which also makes for easier transport. A slotted channel 12 includes a pair of opposing bottom members 30 that forms a slot 32. A first chain link 22 fits into the slotted channel 12 by sliding an adjacent second chain link 48 through the slot 32.

The slot 32 is sized to be slightly larger than a chain link diameter 24 such that the slot 32 allows insertion of the second chain link 48, but prevents substantial rotation of the second chain link 48 about its latitudinal axis 34. Therefore, the bottom members 30 engage the lower outer surface 26 of the first chain link 22 which prevents the first chain link 22 from axially aligning with and sliding through the slot 32.

Referring to FIG. 1, a stop 16, welded to a distal end 17 of the slotted channel 12, prevents the first chain link 22 from sliding through the distal end 17 of the slotted channel 12. As shown in FIG. 1, the stop 16 is formed by welding a steel plate or a portion of steel plate to the distal end 17 of the slotted channel. It is easily understood that endless methods of providing a stopping feature to the distal end 17 of the slotted channel 12 are apparent to one skilled in the art. Further, as is apparent to one skilled in the art the stop 16 can be disposed at an intermediate position along the length of the slotted channel 12.

Figure 3:
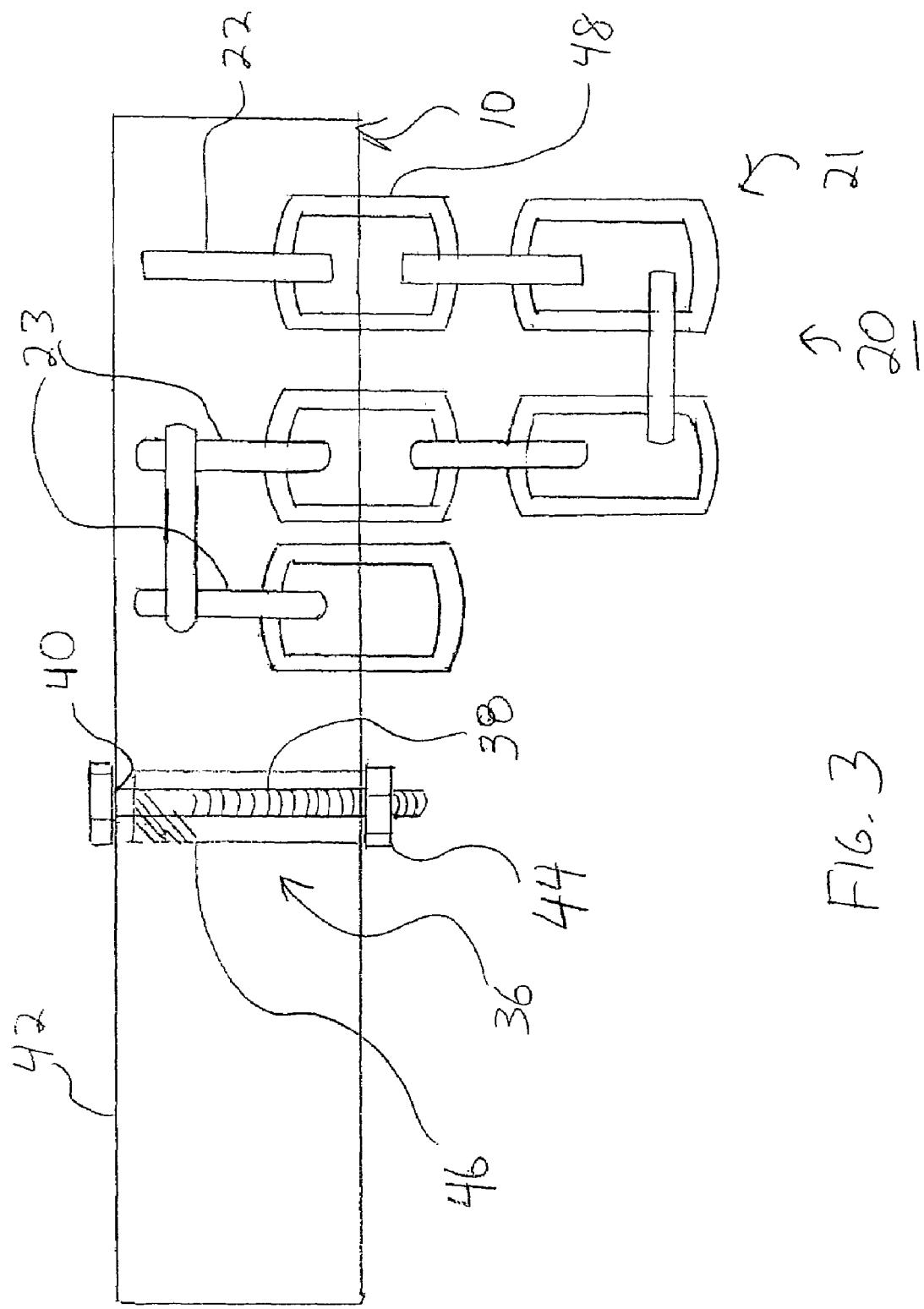
FIG. 3 is a side elevation view of an alternative preferred embodiment of a chain carriage in accordance with the present invention.

To fit the long chain 20 into the chain carriage 10 a series of chain loops 21 (one of which is shown in FIG. 3) is formed in the chain 20. In such a manner, the bottom members 30 engage the first chain link 22 and then a series of randomly interspersed chain links 23. Therefore, several loops formed in the chain 20 creates an organized compact folded chain that stores and transports in a convenient fashion.

A locking mechanism 14 prevents the chain 20 from sliding back out of the insertion end 19 of the slotted channel 12. As will become apparent to one skilled in the art an endless number of methods for manufacturing the locking mechanism 14 are obvious to one skilled in the art.

Figure 9:
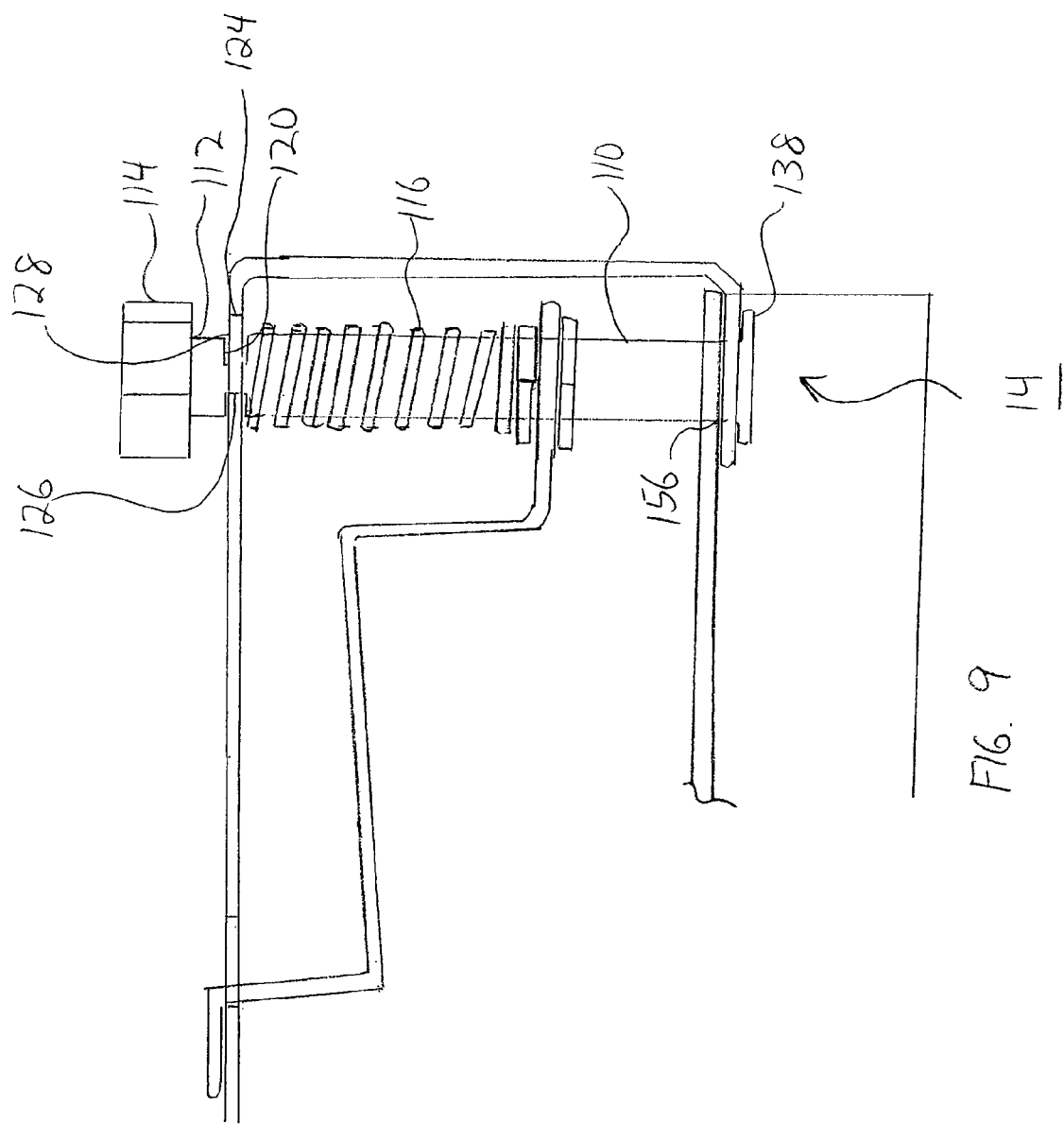
FIG. 9 is a side view of the locking mechanism depicted in FIG. 1, wherein said locking mechanism is in the open position.
Figure 10:
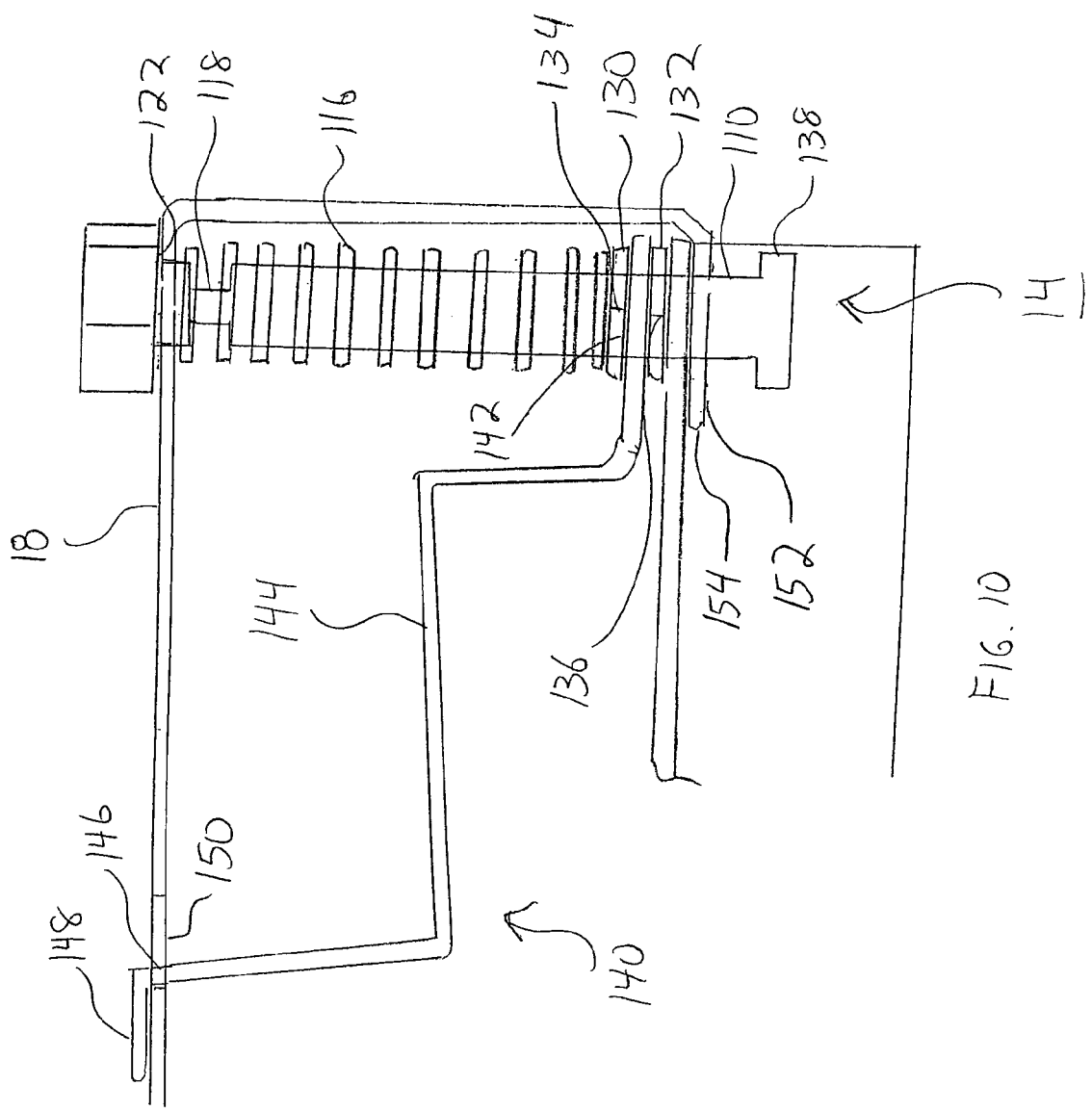
FIG. 10 is a side view of the locking mechanism depicted in FIG. 9 wherein said locking mechanism is in the closed position.

Therefore, without limiting the present invention, the locking mechanism 14 will now be described according to an embodiment as depicted in FIGS. 9 and 10. The locking mechanism 14 includes a shaft 110 welded to a block 138. The shaft 110 slides up through the slot 32 of the slotted channel 12, through a forked slot 154 in a handle under arm 152, through an opening 156 in a top member 42 of the slotted channel 12, through an opening 142 in a lever 140, through a spring 116, and then through a split diameter opening 124 of a handle 18. A threaded nut 114 mates with a threaded top portion 112 of the shaft 110.

The lever 140 includes a handle 144 which compresses the spring 116 and urges the shaft 110 upward when the handle 144 is squeezed toward handle 18. The shaft 110 readily fits through a larger diameter opening 128 of the split diameter opening 124. In this upwardly disposed position, a neck 118 of the shaft 110 is simply urged through the smaller diameter opening 126 so that a downwardly disposed shoulder 120 engages the top of the handle 18. The locking mechanism 14 is now in the open position which allows for insertion and removal of the chain 20.

One compresses the lever handle 144 further to disengage the downwardly disposed shoulder 120 from the top of the handle 18. One positions the threaded nut 114 forward which allows the shaft 110 to align with the larger diameter opening 128. The spring 116 applies pressure to an upper cotter pin 130 that urges the shaft 110 downward into a closed position. A bottom surface 122 of the threaded nut 114 engages the top surface of the handle 18.

In the closed position shown in FIG. 10, the block 138 prevents the chain 20 from sliding through the insertion end 19 of the slotted channel 12. The upper cotter pin 130 cooperates with a lower cotter pin 132 to force the lever opening 142 to ride up and down with respect to the shaft 110.

The lever includes a top member 148 that fits through a lever opening 150 in handle 18 such that a necked member 146 rides inside of the lever opening 150.

Figure 4:
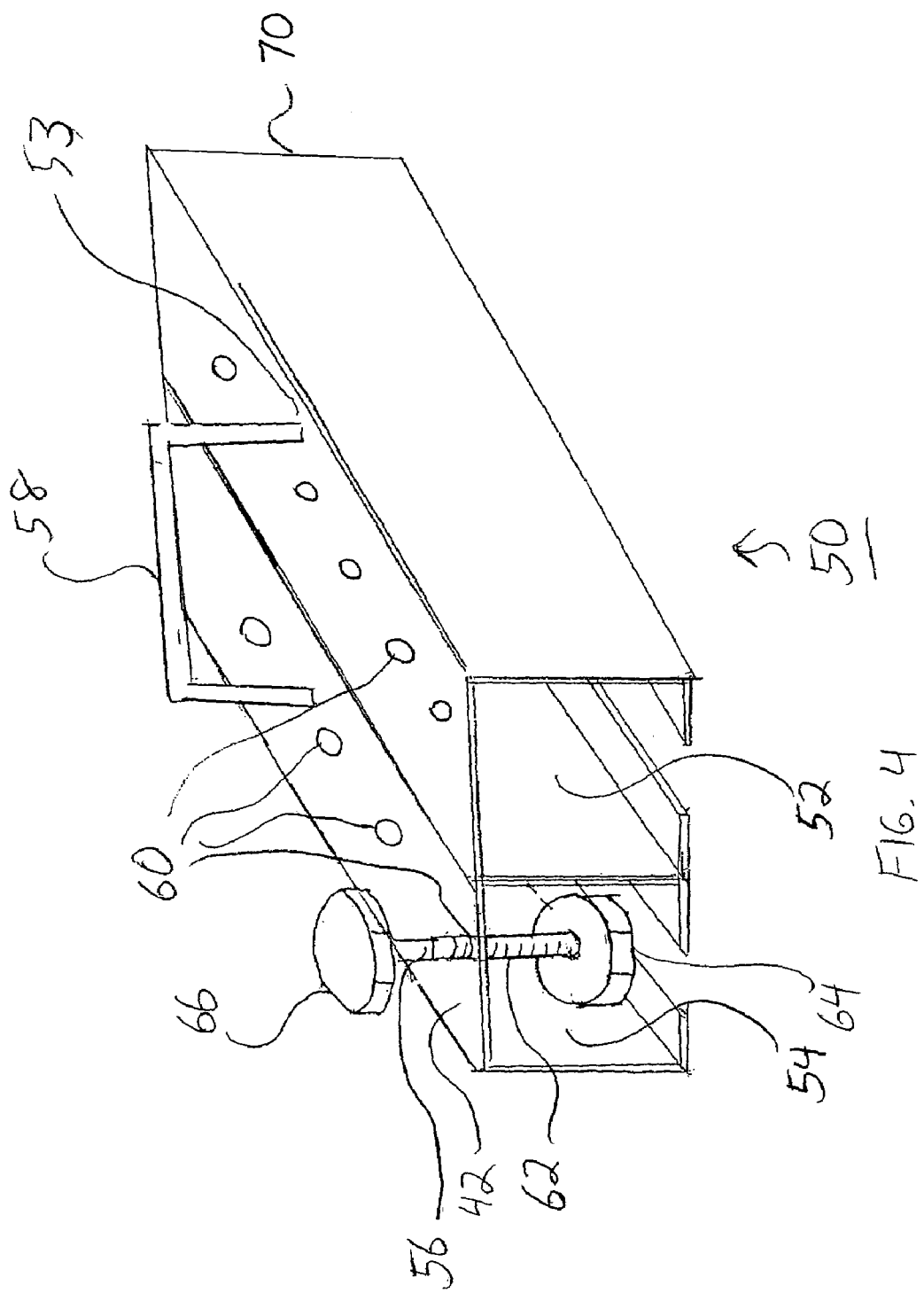
FIG. 4 is a perspective view of yet another preferred embodiment of a chain carriage in accordance with the present invention.

Another locking mechanism shown in FIG. 4 is defined by a threaded rod 62 having a handle 66 welded to its top 56. A threaded opening 60 in the top member 42 of the slotted channel 12 mates with the threaded rod 62 which allows upward and downward movement of the threaded rod 62. A threaded nut 64 mates with the threaded rod 62 to provide a chain blockage.

An intermediate stop 36 provided through an intermediate opening 40 in the slotted channel 12 allows one to release and store only a portion (not shown) of the chain 20. Alternatively, one could also store a plurality of chains using one or more intermediate stops 40.

The intermediate stop 36 can also be referred to as a locking mechanism. As depicted in FIG. 3, the intermediate stop includes a threaded bolt 38 that is secured over the top member 42 and under the slot 32 by a threaded nut 44. A collar 46 provided coaxially over the bolt 38 provides a greater surface area to keep the chains or chain portions separate.

Referring now to FIG. 4 there is shown an alternative embodiment of a chain carriage 50 in accordance with the present invention. The chain carriage 50 includes a pair of parallel situated slotted channels comprising a first carriage chamber 52 welded to a second carriage chamber 54. A handle 58 welded to the top 53 of the chain carriage provides for convenient carrying. The chain carriage 50 operates the same as the chain carriage 10 of FIG. 1. The chain carriage 50 allows for a more compact chain storage which allows for easier transport by hand than the chain carriage 10 of FIG. 1. A further advantage is that a each chamber 52, 54 can store an individual chain where quick separation of a plurality of chains is desired.

Figure 5:
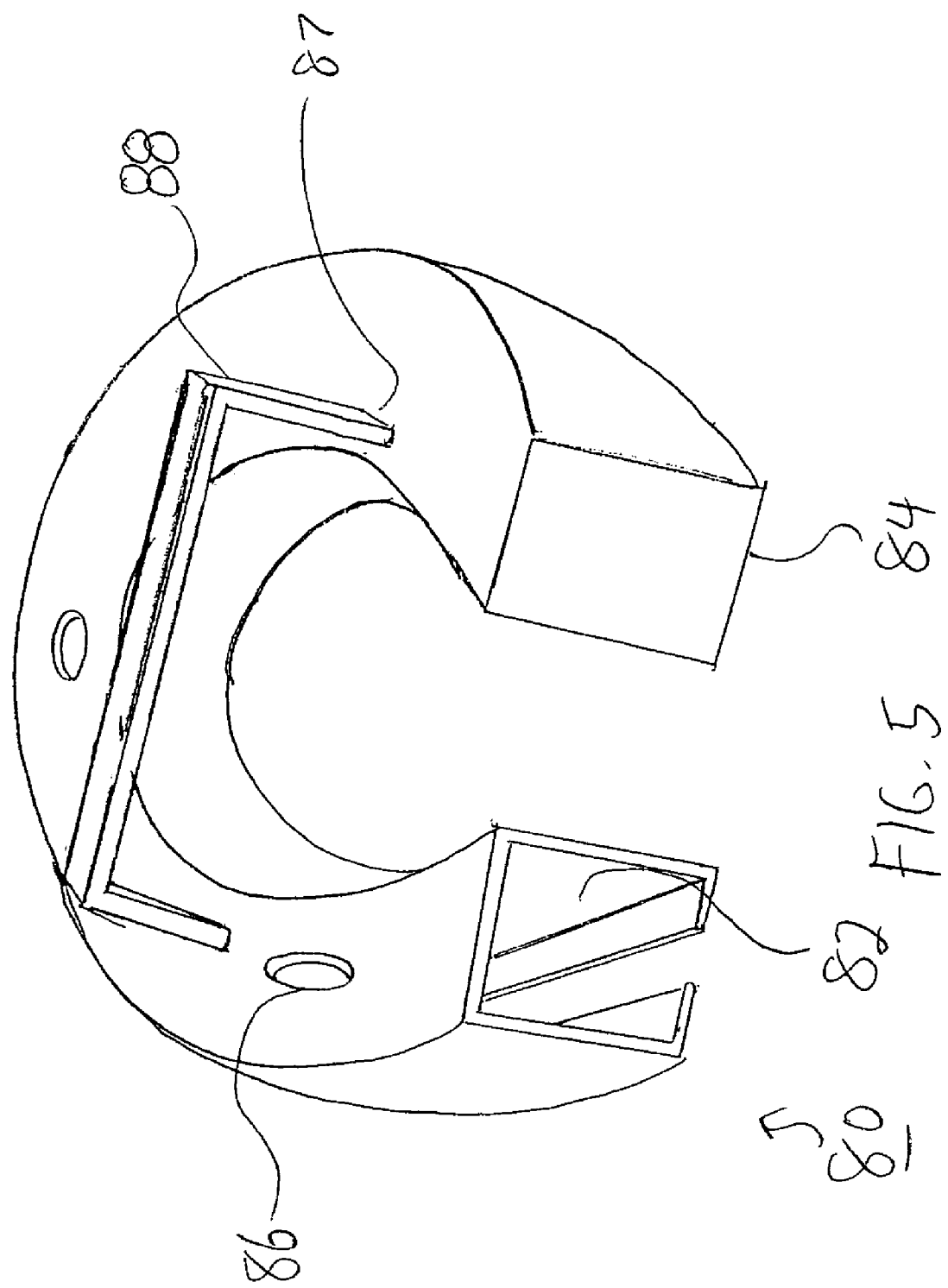
FIG. 5 is a perspective view of still another preferred embodiment of a chain carriage of the present invention.

Still yet another alternative chain carriage in accordance with the present invention is an arcuate chain carriage 80 as depicted in FIG. 5. Once again the arcuate chain carriage 80 operates much the same as the chain carriage of FIG. 1. A handle 88 welded to the top 87 allows for convenient transport by hand of the chain (not shown in FIG. 5).

Figure 6:
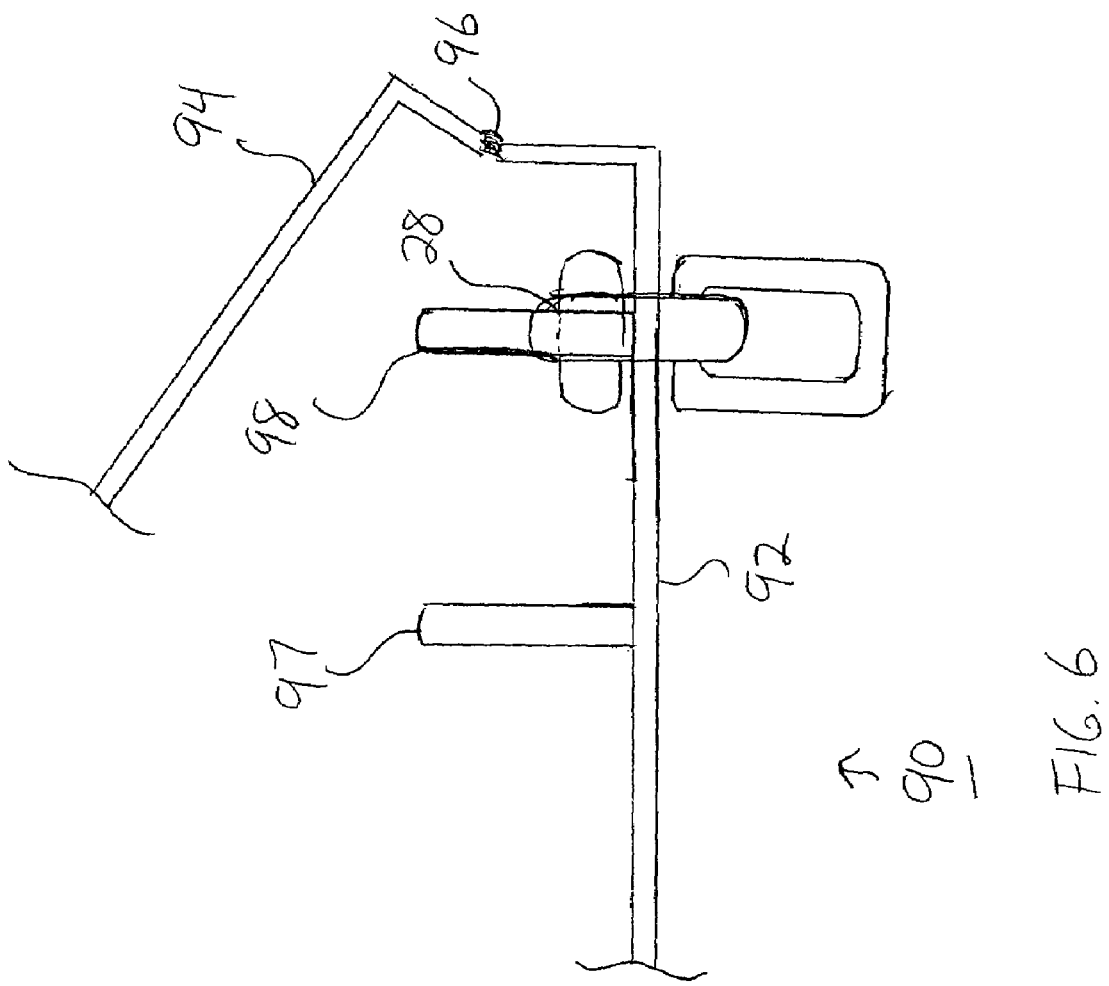
FIG. 6 is a side elevation view of still yet another embodiment of a chain carriage in accordance with the present invention.

Referring now to FIG. 6 there is depicted yet another alternative chain carriage 90 in accordance with the present invention. The chain carriage 90 includes a bottom portion 92 having a plurality of upwardly disposed protrusions 98. The upwardly disposed protrusions 98 engage an inner surface 28 of a chain first chain link 22. Once again, the chain 20 is looped and interspersed chain links (not shown) are fitted over the upwardly disposed protrusions 98.

A hinge 96 connects a top member 94 to the bottom member 92. In the open position the chain is inserted. In the closed position, the distance between the top member and the top 97 of the upwardly disposed protrusions 98 is smaller than the diameter of the first chain link 22 so that the chain 20 cannot become dislodged from the chain carriage 90.

Figure 8:
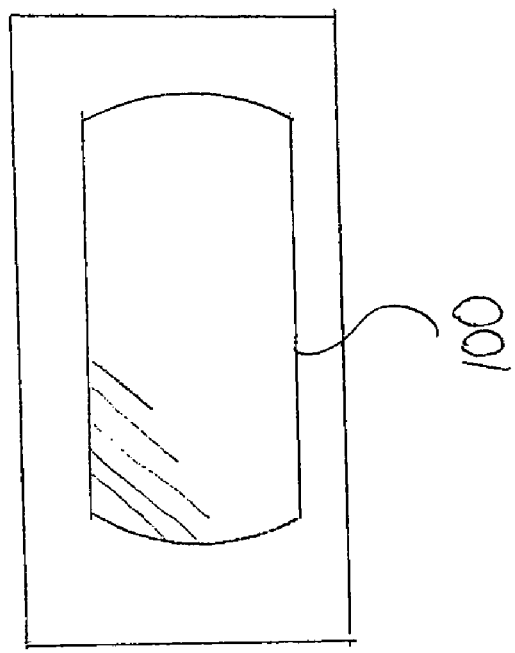
FIG. 8 is a side view of the coupling member of FIG. 7.
Figure 7:
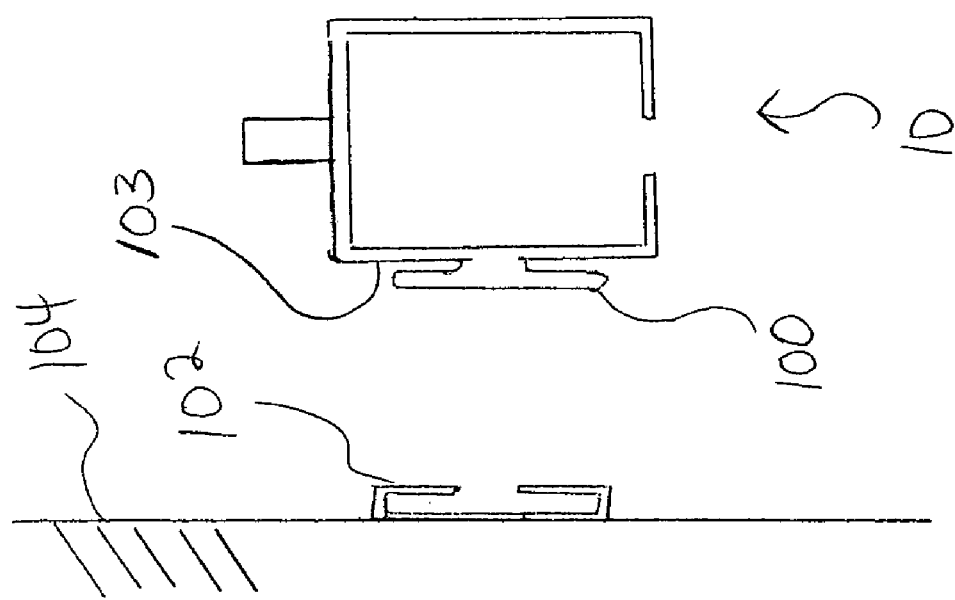
FIG. 7 is a front view of the chain carriage of FIG. 1 having a coupling member disposed off of one side for engagement with a receiving track.

As stated supra, often times chains are stored in trucks and the like simply by winding the chain up and placing on the floor. Referring now to FIGS. 7 and 8, a truck wall 104 includes a receiving track 102 that mates with a coupling member 100 that is disposed off of one side 103 of the chain carriage 10. The coupling member 100 simply slides into and out of the receiving track for convenient storage, transport and access of the chain 20. In this manner, the chain carriage 10 mounts to the truck. Once again it should be apparent to one skilled in the art that other mating devices will also work for mating the chain carriage 10 to the truck or other receiving surfaces, such as a garage wall.

Figure 11:
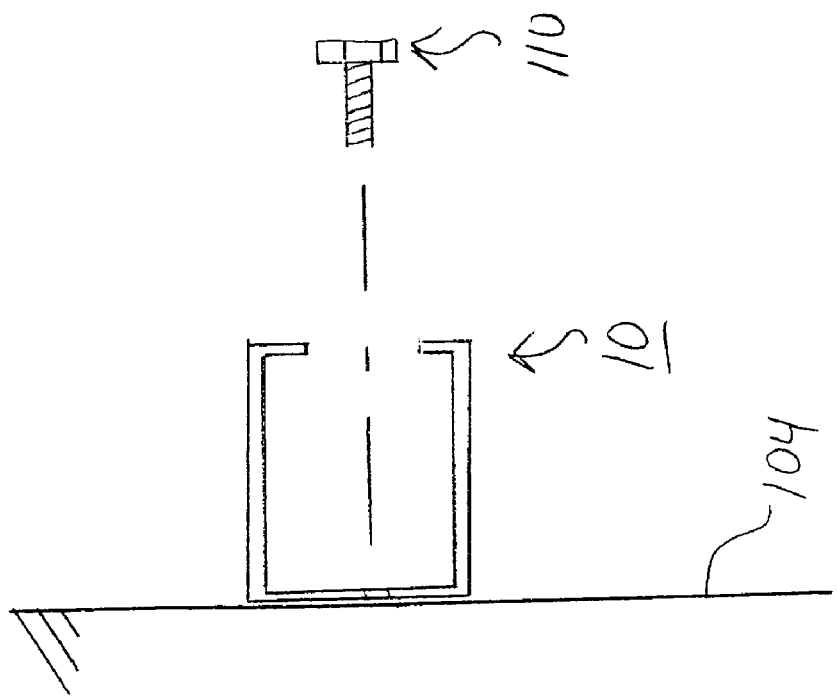
FIG. 11 is a side elevation view shown a chain carriage mounted to a wall.
Figure 12:
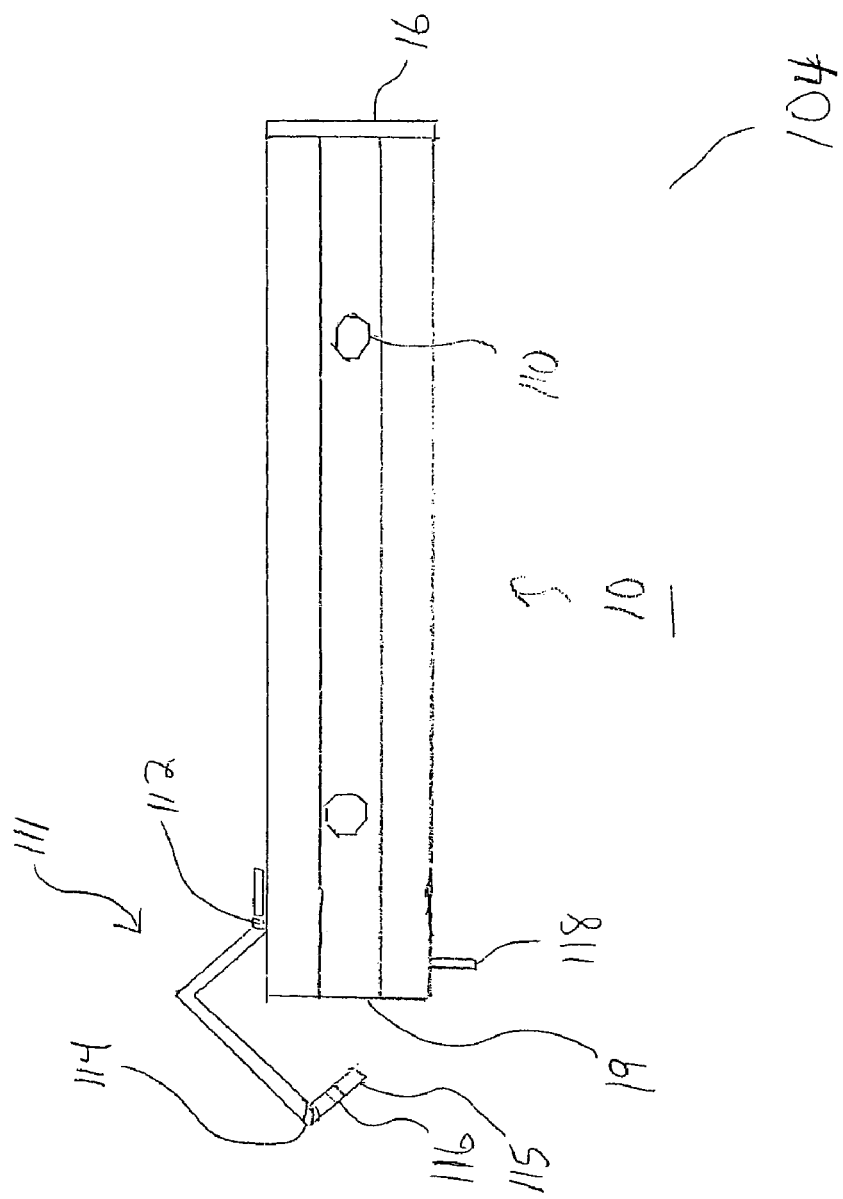
FIG. 12 is a front elevation view of the chain carriage of FIG. 11.

For example, and now referring to FIGS. 11 and 12, the chain carriage 10 bolts to the truck wall 104 using a bolt 110 or other securing devices. The stop 16 keeps the chain 20 stable inside of the chain carriage 10. A locking mechanism 111 includes a first hinge 112 that allows the locking mechanism to swing away from the insertion end 19. A second hinge 114 allows a lower portion 115 to swing over a downwardly disposed U-bolt 118. An opening 116 in the lower portion 115 aligns with U-bolt 118. A lock (not shown) or other object is inserted into the U-bolt so that the lower portion 116 does not swing away.

Figure 13:
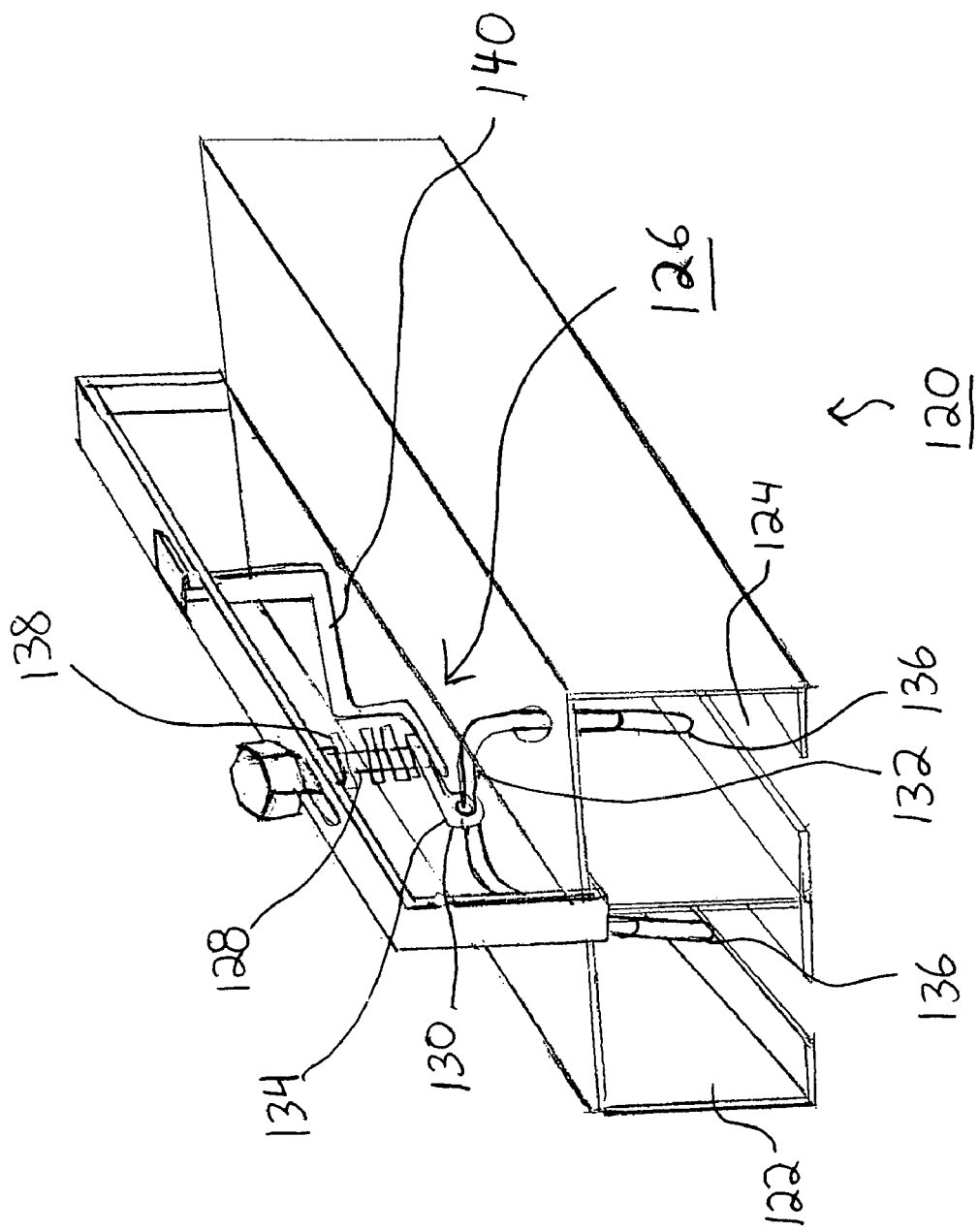
FIG. 13 is a perspective view of a chain carriage having parallel situate slotted channels.

Turning now to FIG. 13, there is shown a chain carriage 120 having a pair of parallel situate slotted channels 122, 124 and a single release mechanism 126 that provides chain access to each of the slotted channels 122, 124. The release mechanism includes a downwardly disposed shaft 128 having a cotter pin 130 inserted therethrough. A U-shaped stop 132 fits through the head 134 of the cotter pin 130 such that each leg 136 of the U-shaped stop 132 slides into a slotted channel 122, 124.

A spring 138 urges the U-shaped stop 132 into the stop or lock position shown in FIG. 13. A lever 140 allows the user to force the U-shaped stop 132 upward, which in turn allows chain access to the slotted channels 122, 124.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. A portable chain storage apparatus for storing a chain, wherein said chain comprises a plurality of chain links, each of said chain links having a link diameter, a latitudinal axis and a link width, each of said chain links being interconnected with at least one other chain link, each of said chain links having an inner and outer surface, said chain storage apparatus comprising:
   a frame having an opening at a first end;
   a chain link engagement means formed by inwardly opposing members of said frame adapted to engage a plurality of non-adjacent portions of said chain through said opening, such that each of said non-adjacent chain portions includes at least one chain link, and wherein said at least one chain link of each of said chain portions is engaged by said chain link engagement means;
   a stopping means that prevents said at least one chain portion from disengaging with said engagement means; and
   a locking means adapted to engage at least one chain link of a single chain portion, wherein said locking means includes a lock and unlock position, such that in the unlock position said locking means allows said plurality of non-adjacent portion of said chain ingress and egress to said engagement means, and in the lock position said at least one chain link is prevented from disengaging with said engagement means.

2. The portable chain storage apparatus of claim 1, wherein said chain link engagement means further includes a slotted channel having a pair of inwardly opposed bottom members, wherein said inwardly opposed bottom members engage the outer surface of said at least one chain link of each of said chain portions.

3. The portable chain storage apparatus of claim 2, wherein said slotted opening further includes a width being greater than the link diameter, and wherein said opposing bottom members prevents substantial rotation about the latitudinal axis of said at least one chain link that is disposed between said slotted opening.

4. The portable chain storage apparatus of claim 2, wherein said slotted opening further includes a width of between one half inch and one inch.

5. The portable chain storage apparatus of claim 2, wherein said slotted channel includes a top member, and further including a handle disposed from said top member.

6. The portable chain storage apparatus of claim 2, wherein said slotted channel is substantially straight shaped.

7. The portable chain storage apparatus of claim 2, further including a first coupling means for mating with a second coupling means of an exterior surface.

8. The portable chain storage apparatus of claim 7, wherein said slotted channel includes at least one side member and wherein said first coupling means is disposed from said at least one side member for mating with a second coupling means of an exterior surface.

* * * * *